(12) United States Patent
    Stroebel

(10) Patent No.: US 10,752,289 B2
(45) Date of Patent: Aug. 25, 2020

(54) CONTROL SYSTEM FOR STEERING A TOWING VEHICLE WITH A TRAILER

(71) Applicant: Bayerische Motoren Werke Aktiengesellschaft, Munich (DE)

(72) Inventor: Michael Stroebel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 137 days.

(21) Appl. No.: 16/005,904

(22) Filed: Jun. 12, 2018

(65) Prior Publication Data

US 2018/0354553 A1   Dec. 13, 2018

(30) Foreign Application Priority Data

Jun. 13, 2017  (DE) .......................... 10 2017 209 980

(51) Int. Cl.
    *B62D 13/06*   (2006.01)
    *B60D 1/62*    (2006.01)
    (Continued)

(52) U.S. Cl.
    CPC .............. *B62D 13/06* (2013.01); *B60D 1/245* (2013.01); *B60D 1/62* (2013.01); *B60K 1/00* (2013.01);
    (Continued)

(58) Field of Classification Search
    CPC .... B62D 13/06; B62D 13/025; B62D 15/021; B62D 15/025; B62D 15/027; B60D 1/62;
    (Continued)

(56) References Cited

U.S. PATENT DOCUMENTS 4,040,006 A * 8/1977 Kimmel ................. B60Q 1/305
                                                    340/431
5,912,616 A * 6/1999 Valentino ........... B62D 53/0871
                                                    280/432
(Continued)

FOREIGN PATENT DOCUMENTS

DE          101 54 612 A1    5/2003
DE     10 2012 207 647 A1   11/2013
DE     10 2016 105 916 A1   10/2016

OTHER PUBLICATIONS

German-language Search Report issued in counterpart German Application No. 10 2017 209 980.1 dated Jan. 26, 2018 with partial English translation (13 pages).

*Primary Examiner* — Thomas Ingram
(74) *Attorney, Agent, or Firm* — Crowell & Moring LLP

(57) ABSTRACT

In a control system for steering a combination with at least one electronic control unit, with a sensor apparatus for capturing the bend angle of the combination and with a display unit, the control unit has a memory region for storing a maximum reversible bend angle, a memory region for storing an upper bend angle change threshold value, and/or a memory region for storing a left hand bend angle range and a right hand bend angle range with reference to the zero line corresponding to a straight combination. A functional unit is designed to output a recommended action for moving forward on the display unit and/or for carrying out an autonomously executed forward movement, when the presence of at least one defined situation in relation to the values related to the bend angle stored in the memory region is ascertained through evaluation of the sensor apparatus.

8 Claims, 3 Drawing Sheets

(51) Int. Cl.
*B60K 1/00* (2006.01)
*B60D 1/24* (2006.01)
*B60W 30/00* (2006.01)
*B62D 13/02* (2006.01)
*B62D 15/02* (2006.01)

(52) U.S. Cl.
CPC ........... *B60W 30/00* (2013.01); *B62D 13/025* (2013.01); *B62D 15/021* (2013.01); *B62D 15/025* (2013.01); *B60W 2300/14* (2013.01); *B60W 2520/22* (2013.01); *B60Y 2200/147* (2013.01); *B62D 15/027* (2013.01)

(58) Field of Classification Search
CPC ......... B60D 1/245; B60K 1/00; B60W 30/00; B60W 2300/14; B60W 2520/22
See application file for complete search history.

(56) References Cited

U.S. PATENT DOCUMENTS

| | | | |
|---|---|---|---|
| 6,292,094 B1* | 9/2001 | Deng | B62D 7/159 |
| | | | 340/431 |
| 2014/0277941 A1* | 9/2014 | Chiu | B62D 13/06 |
| | | | 701/41 |
| 2014/0297128 A1* | 10/2014 | Lavoie | B60W 10/04 |
| | | | 701/41 |
| 2016/0288786 A1 | 10/2016 | Lavoie et al. | |
| 2017/0174209 A1* | 6/2017 | Lavoie | B60T 8/1708 |

* cited by examiner

CONTROL SYSTEM FOR STEERING A TOWING VEHICLE WITH A TRAILER

CROSS REFERENCE TO RELATED APPLICATION

This application claims priority under 35 U.S.C. § 119 from German Patent Application No. DE 10 2017 209 980.1, filed Jun. 13, 2017, the entire disclosure of which is herein expressly incorporated by reference.

BACKGROUND AND SUMMARY OF THE INVENTION

The invention relates in particular to a control system for steering a towing vehicle with a trailer, in particular when reversing, with an electronic control unit that at least specifies corrections for the steering angle of the steerable wheels of the towing vehicle depending on the angle between the longitudinal axis of the towing vehicle and the longitudinal axis of the trailer or of the trailer drawbar. Reference is made here, for example, to DE 101 54 612 A1 for the technical background.

Reversing (backing-up) with a trailer that is moved through a trailer coupling by a towing vehicle requires some practice, since the trailer tends to "shear away". This task is made significantly more difficult when a multi-axle trailer is involved. A method is known, for example, from DE 101 54 612 A1 in which it is demonstrated by means of an experimental vehicle consisting of a towing vehicle and a two-axle trailer that it is possible to assist the vehicle driver in this difficult task. This can involve an active so-called "by-wire" steering system consisting of a steering handle and a wheel angle actuator controlled by a computer being fitted into the towing vehicle. When moving forward, the driver controls the wheel angle actuator by way of the steering handle and thus steers the towing vehicle. When reversing (i.e. when maneuvering or parking) the driver does not directly steer the towing vehicle, but specifies the intended course of the trailer through the steering handle. This means that the driver steers, so to speak, the trailer around a virtual point that is fixed with respect to the trailer; said point can, in the case for example of two-axle trailers, be the center of the steerable trailer axis or, in the case of single-axle trailers or those with a tandem axis, can be the ball head of the trailer drawbar. A computer then calculates the required steering angles at the towing vehicle in order to maintain the trailer on the desired course, and accordingly controls the wheel angle actuator of the towing vehicle. The driver thus steers the trailer directly with the steering handle.

It has been found to be particularly advantageous in such cases if the drive of the wheel angle actuator of the towing vehicle is performed by a closed-loop controller that receives, through appropriate sensors, information about the orientation or position of the trailer in relation to the towing vehicle. The driver, with his inputs at the steering handle, can here be integrated into the control loop. The combination of driver input and exact ascertainment of the trailer orientation with respect to the towing vehicle by use of appropriate sensors makes it possible for an open-loop or closed-loop controller contained in an electronic control unit to take possible deviations into account and compensate for them.

In this known prior art, angle sensors, for example, can be used, being attached between the steerable axle of the trailer and the trailer structure and at the trailer coupling of the towing vehicle. With this it is possible to determine on the one hand the steering angle of the steerable trailer axle and on the other hand the angle between the longitudinal axis of the towing vehicle and the longitudinal axis of the trailer drawbar. However, such angle sensors, and the transmission of their signals to an electronic evaluation and control unit, are relatively complex.

A more economical solution is proposed in DE 101 54 612 A1, in which the angle (for example between the longitudinal axis of the towing vehicle and the longitudinal axis of the trailer or of the trailer drawbar) is determined from the signals of at least two distance sensors that are provided on the towing vehicle and/or on the trailer, and which establish the respective distance between the towing vehicle and the trailer or the drawbar of the same. An idea behind this solution is that of using the distance measuring sensor systems that are already present on many automobiles in order to convey to an electronic evaluation and control unit the necessary information about the orientation or position of the trailer in relation to the towing vehicle when reversing. Until now this distance measuring sensor system has, in particular, served to advise of threatening collisions when parking the motor vehicle or automobile. This sensor system here monitors or establishes the distance between the motor vehicle and a nearby obstacle. According to DE 101 54 612 A1, the measurement result of this sensor system should then be used to determine the angle between the longitudinal axis of the towing vehicle and the longitudinal axis of a single-axle trailer coupled thereto. Several such distance sensors are usually arranged next to one another in the rear bumper of an automobile. If the longitudinal axis of the trailer is continued in the longitudinal axis of the towing vehicle, so that an angle of 0° ("zero line") is present between these longitudinal axes, then the distance between the towing vehicle and the trailer, or its front edge, is the same on the left hand side of the vehicle as that on the right hand side of the vehicle. If, on the other hand, the longitudinal axes of the towing vehicle and the trailer extend at an angle with respect to one another, i.e. there is an angle ("bend angle") $\alpha$ unequal to 0° (or unequal to 180°) between these longitudinal axes, then the distance between the towing vehicle and the trailer on the side of the vehicle that is on the left when viewed in the direction of travel of the towing vehicle is unequal to the corresponding distance on the right hand side of the vehicle.

With the information obtained in this way and the angle $\alpha$ derived from it, an electronic evaluation and control unit can, in the presence of a suitable towing vehicle steering system, in particular of a so-called by-wire steering system, assist the vehicle driver when reversing, using an algorithm (not described in more detail here). The electronic control unit initiates suitable steering angles through the suitable steering system at the steerable wheels of the towing vehicle.

It is, however, not only possible for a correction for the steering angle to be fed directly into a suitable steering system of the towing vehicle which influences the steering angle of the steerable wheels independently of or in addition to the specifications of the vehicle driver, but for the correction for the steering angle to be shown to the driver. This means that with such a distance measurement sensor system on towing vehicles that do not possess an active (for example "by-wire") steering system that permits additional steering manipulations independently of the vehicle driver, the distance information are at least used to provide the vehicle driver with suitable information as to how he should make corrections at his steering wheel or at his steering handle. In the simplest case, when reversing with the distance sensors, a collision warning can be given, i.e., in the presence of a correspondingly large angle α between the longitudinal axes of the towing vehicle and the trailer. The vehicle driver is thus advised of a threatening collision between the towing vehicle and trailer.

A driver assistance system for reversing a two-track motor vehicle with a trailer is furthermore also known from DE 10 2012 207 647 A1, wherein the trailer is fitted with at least one sensor device whose signals are evaluated for the formation of a recommended action intended for the driver of the motor vehicle or evaluated for a lateral control and/or longitudinal control of the motor vehicle initiated autonomously by the driver assistance system. This document already assumes a prior art according to which a camera is to be attached to the rear region of the trailer, whose image is shown to the driver on the display of a navigation device installed in the motor vehicle, together with the current trajectory of the reversing combination (=towing vehicle with trailer) and, possibly, with a target steering track. The so-called trailer angle (=bend angle), i.e. the angle between the longitudinal axis of the motor vehicle or the towing vehicle and the longitudinal axis of the trailer, which in principle can be measured in various ways, is taken into account in determining the trajectory.

The display of the trajectory in two-track, two-axle vehicles, i.e. the movement path of the vehicle, on a screen is a generally known aspect of the prior art, and how such a trajectory can be determined from the available data is known to those skilled in the art. Corresponding considerations apply to a target steering track if, for example, a target is specified on said screen. The way in which the lateral guidance, possibly even in connection with the longitudinal guidance of a motor vehicle, is initiated by a driver assistance system if this motor vehicle is, for example, to be driven automatically into a parking space, is also known to those of skill in the art.

For a combination consisting of a multi-axle motor vehicle as the towing vehicle and a trailer, the determination of the trajectory of the reversing combination is, however, incomparably more difficult, and in fact already when a single-axle trailer is involved. In such a case, the trailer angle mentioned above, which is most often referred to as the bend angle, is indeed helpful in principle, but this parameter is not alone sufficient for determining the trajectories with the desired precision.

DE 10 2012 207 647 A1 shows how the precision of a driver assistance system for reversing a combination, in particular consisting of a two-track motor vehicle with a trailer, can be increased. For this purpose, information relating to the axle geometry of the trailer, specifically its number of axles and the drawbar length, as well as the track width, are also taken into account according to this step in the preparation of the recommended action, or in the lateral and/or longitudinal guidance of the motor vehicle initiated by the driver assistance system. The accuracy can be significantly increased in this way as compared with the consideration of the trailer angle or the bend angle alone.

In particular, if a driver assistance system according to the invention should also assist when parking the combination into a large parking space, it is advantageous if, in addition to the axle geometry of the trailer, the total length and, optionally, the total width of the trailer is taken into account as further information when preparing a recommended action or in the lateral and/or longitudinal guidance initiated by the driver assistance system. With this further information, the total length of the combination is known to the assistance system, since the total length of the towing motor vehicle, including the trailer coupling, can simply be stored.

Preferably, similarly to the prior art, the bend angle, as the angle between the longitudinal axis of the motor vehicle and of the trailer, is finally also taken into account in the calculations of the driver assistance system.

In a driver assistance system for combinations of this type, a measurement and display function known in principle and relating to obstacles when reversing can furthermore be extended to the operation of a motor vehicle with a coupled trailer, in that sensors suitable for the purpose are provided on the towing vehicle and/or on the rear of the trailer. The signals are supplied to a display unit present in the towing vehicle. It is also possible for a reversing camera to be provided in the rear region of the trailer, which supplies images from the rear of the trailer to a display in the towing vehicle, where limit lines within which the combination can move can also be shown.

An automatic calibration of parameters important for the control system is also, however, possible: by evaluating the signals of, for example, the yaw rate sensor of the motor vehicle and of a bend angle sensor, already mentioned, it becomes possible for the driver of the motor vehicle simply to have to couple on a new trailer and to drive forwards through a few wavy curves. In this way the necessary parameters, such as the effective drawbar length of the new trailer, are identified, the bend angle sensor calibrated, and the data appropriately stored.

An automatic closed-loop control of the lateral guidance of the motor vehicle, and thus of the combination in accordance with a predetermined target corridor or a suitably determined or predetermined maneuvering curve, can also be a component of the known driver assistance system. The target corridor can here be adjusted and changed dynamically by the driver, for example by way of a central display/operating unit prior to and during a maneuvering procedure.

The present invention is based on the above-mentioned prior art, and addresses the object of further improving a driver assistance system for a combination.

This object is achieved by a control system for steering a towing vehicle in accordance with embodiments of the invention.

In the control system according to the invention for steering a combination (=towing vehicle with trailer) with at least one electronic control unit, with a sensor apparatus for capturing the bend angle of the combination (=angle between the longitudinal axis of the towing vehicle and the longitudinal axis of the trailer) and with a display unit, the control unit comprises: one or more memory regions for storing one or more of a maximum reversible bend angle, an upper bend angle change threshold value, or a left hand bend angle range and a right hand bend angle range with reference to the zero line corresponding to a straight combination; and a functional unit that is designed to output a recommended action for moving forward on the display unit and/or for carrying out an autonomously executed forward movement, when the presence of at least one defined situation in relation to the values related to the bend angle stored in the memory region is determined through evaluation of the sensor apparatus.

The memory region of the maximum reversible bend angle can also refer to a maximum bend angle determined by the system itself. The maximum reversible bend angle (applicable to the left or right of the zero line) can be specified, preferably variably, depending on the drawbar length of the trailer on which it depends and which can also be stored, when different trailers are used.

The target bend angle can result automatically from an intended parking position if this has been stored in the system, for example by training, and when the towing vehicle has been determined in the immediate neighborhood of the target parking position (e.g. the home address from the navigation system).

Preferably, the steering method that can be carried out on the basis of the control system according to the invention, wherein the control system, or the towing vehicle, preferably receives information from sensors that determine obstacles, is performed depending additionally on obstacles determined in the surroundings of the combination.

The invention is based on the following considerations on the basis of the prior art mentioned above.

In a trailer assistance system function, the target bend angle of the trailer to be maneuvered is specified, for example, by the driver through an operating action. The system compares the target bend angle with the actual bend angle, and adjusts this through the vehicle movement. The following problematic situations can result here:

1. If the trailer is located (actual bend angle) in the irreversible range of positions, the trailer can no longer be maneuvered into the other direction simply through reversing. This can happen if the trailer is attached when already in this range, or if the trailer has drifted away, for example as a result of ice.
2. If the trailer is still in the reversible range, a comparatively large change in the angle desired by the driver can lead to a very long reversing movement. Often, however, obstacles mean that an insufficient distance is available for such a maneuver.
3. If, even in the reversible range, the bend angle must change from the positive bend angle range into the negative bend angle range (referred to the left hand and right hand sides of the zero line when the combination is straight), and a large counter-steering or outward swing of the towing vehicle is not possible, the maneuver cannot be continued.

For the situations described in particular, a forward corrective movement is recommended according to the invention or (preferably after confirmation from the driver) carried out autonomously. Such a corrective movement of the vehicle can alleviate the situations. The corrective movement involves the towing vehicle moving at least straight forward, provided the surroundings permit.

The corrective movement through traveling forward can preferably take place to different extents. In situation 1, reaching the reversible region would already be enough to permit maneuvering. In situations 2 and 3, the trailer would be aligned approximately straight by the corrective movement. A distinction should preferably be made as to whether the driver himself controls longitudinal movement (accelerator and brake) or whether this is entirely taken over by the system (autonomous, remote). Depending on this, different implementations are possible. The driver can be prompted to make a manual corrective movement, or an autonomous corrective movement can be offered to him on the display unit, which he can then activate by confirming.

Shorter movements with large angle changes are achieved through the invention. A maneuver can be continued, although the trailer is initially in the irreversible region. If the towing vehicle cannot swing outward as a result, for example, of obstacles, the maneuver can in some cases nevertheless be continued.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
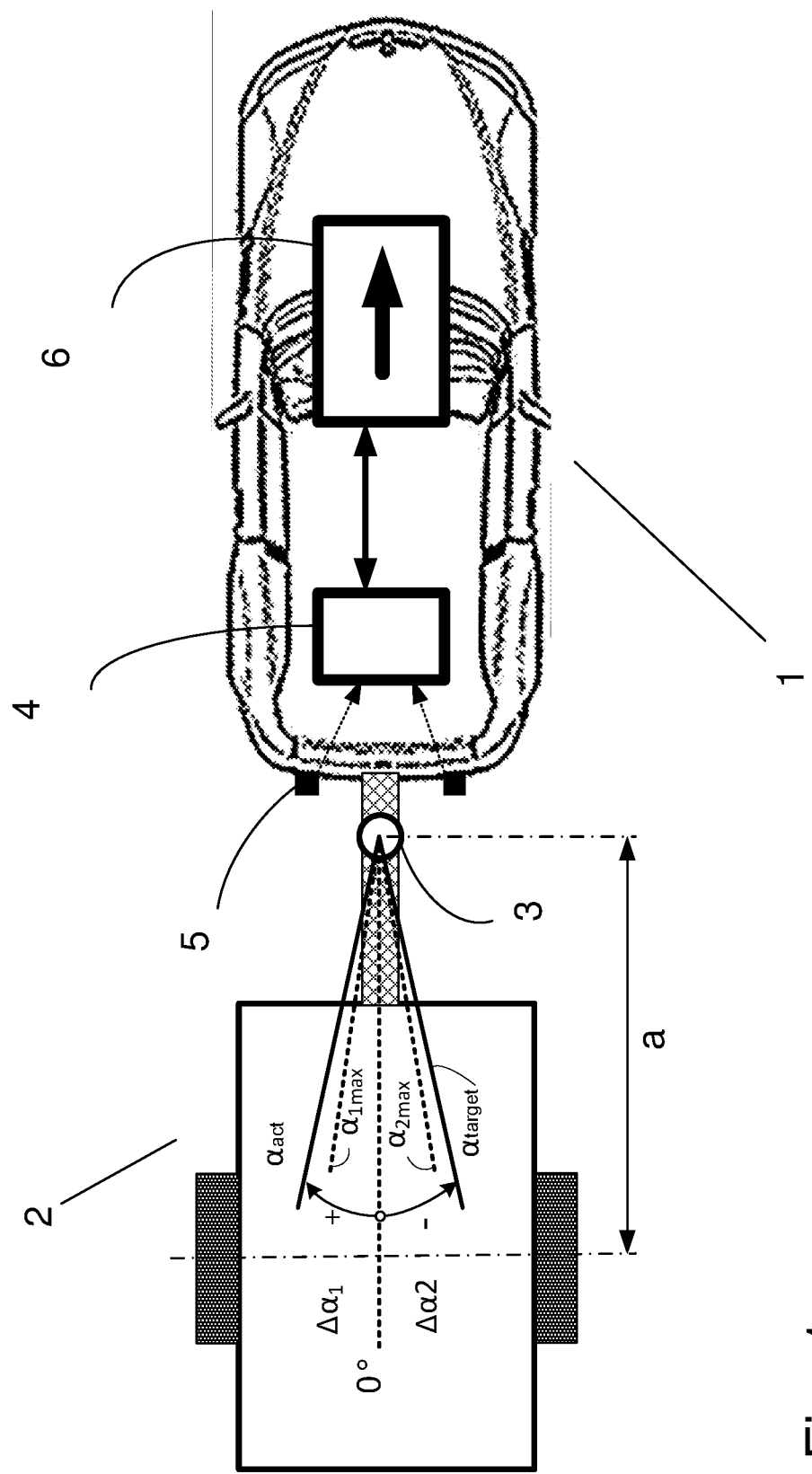
FIG. 1 shows the essential required components of the control system according to an embodiment of the invention for carrying out the steering method underlying the control system.

A towing vehicle 1 with a trailer 2 is illustrated in FIG. 1. The towing vehicle 1 has at least one electronic control unit 4, a sensor apparatus 5 for capturing the bend angle $\alpha_{act}$ and a display unit 6. The values related to the bend angle shown in FIG. 1 are explained in more detail in connection with FIGS. 2 and 3.

Figure 2:
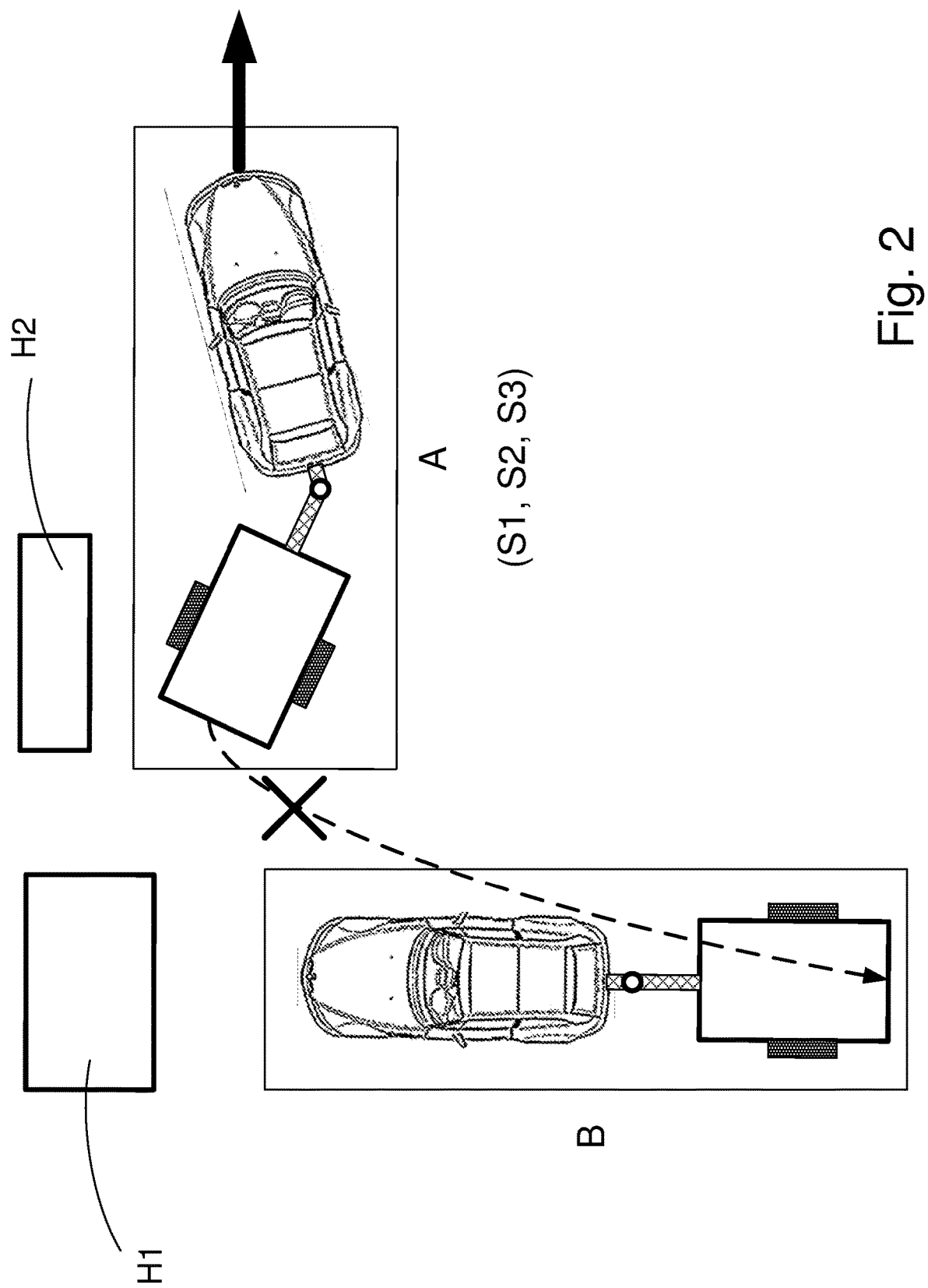
FIG. 2 shows an example of a possible situation in which the invention is used.
Figure 3:
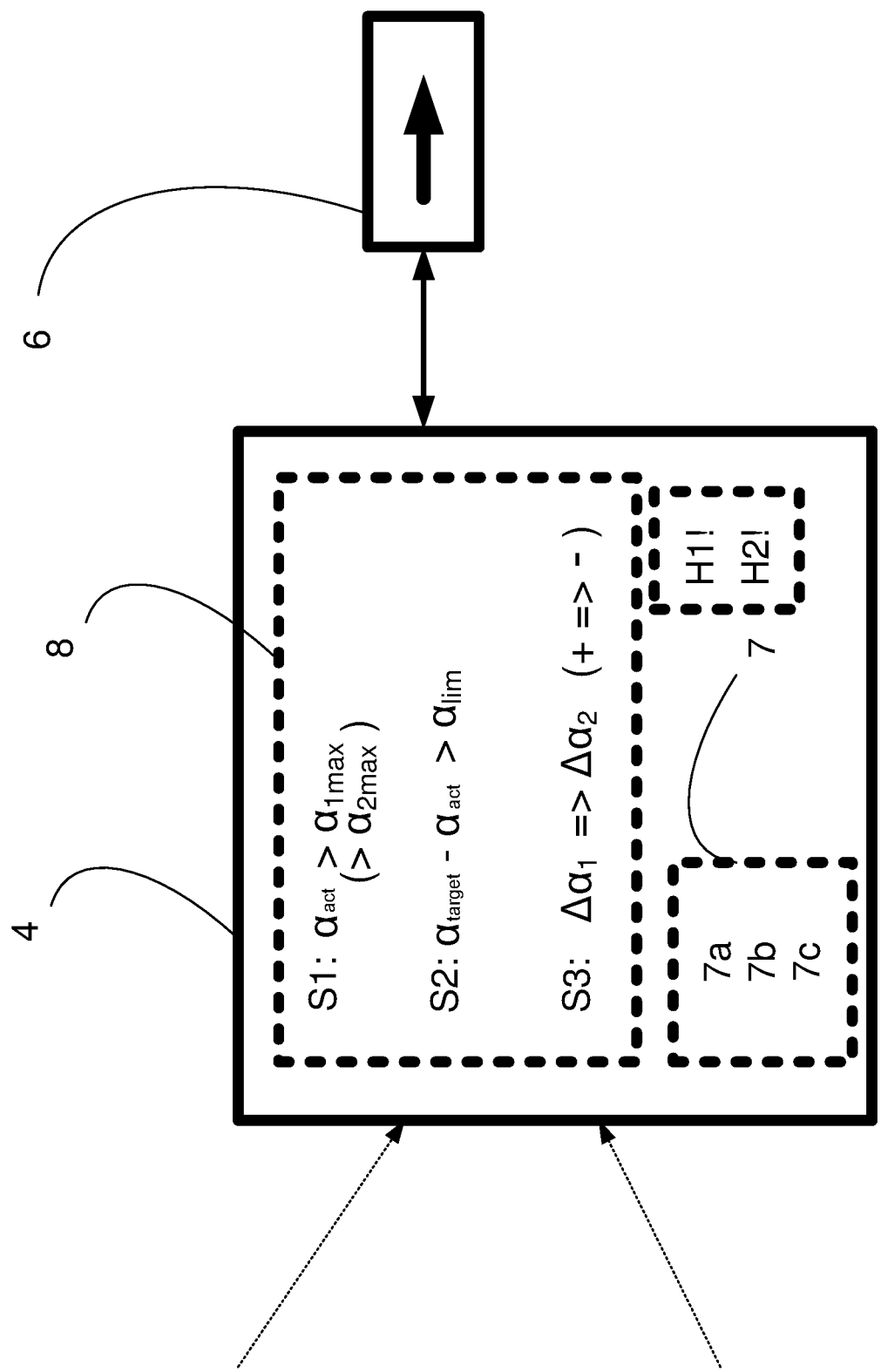
FIG. 3 shows more precise details of the control unit designed appropriately for the control system.

In FIG. 2, three problematic situations, S1, S2 and S3 in which the invention is relevant, and which are illustrated more precisely in FIG. 3, are illustrated simultaneously in FIG. 2 schematically through an actual combination position A and a target combination position B.

Situation S1: the actual bend angle $\alpha_{act}$ has exceeded the maximum reversible bend angle $\alpha_{1max}$ in the left hand (+) bend angle range $\Delta\alpha_1$.

Situation S2: the difference between the actual bend angle $\alpha_{act}$ and the target bend angle $\alpha_{target}$ has exceeded the upper bend angle change threshold value $\alpha_{lim}$; this means that a relatively large change in the bend angle is required to reach the target parking position B. In addition, obstacles H1 and H2 that restrict the possible movement path have been determined.

Situation S3: the actual bend angle $\alpha_{act}$ is within the left hand (+) bend angle range $\Delta\alpha_1$ and the target bend angle $\alpha_{target}$ is in the right hand (−) bend angle range $\Delta\alpha_2$.

According to FIG. 3, the control unit 4 comprises:

a memory region 7a of a memory 7 for storing a maximum reversible bend angle $\alpha_{1max}$; $\alpha_{2max}$, and a memory region 7b for storing an upper bend angle change threshold value $\alpha_{lim}$, and/or a memory region 7c for storing a left hand (+) bend angle range $\Delta\alpha_1$ and a right hand (−) bend angle range $\Delta\alpha_2$ relating to a zero line (0°) corresponding to a straight combination, as well as a functional unit 8 that is operatively configured for the output of a recommended action for moving forward on the display unit 6 and/or for carrying out an autonomously executed forward movement, if at least one defined situation S1, S2 and/or S3 illustrated in FIG. 2 in terms of the bend-angle-related values $\alpha_{1max}$, $\alpha_{2max}$; $\alpha_{lim}$; $\Delta\alpha_1$, $\Delta\alpha_2$ stored in the memory 7 is determined through evaluation of the sensor apparatus 5.

In a preferred form of the invention, the forward movement recommendation, or the automatic carrying out of the forward movement provided for the situations 2 and 3, is only activated if the movement path needed for a pure reverse maneuver is not free from obstacles. The bend angle change threshold value $\alpha_{lim}$ can, for example, be specified depending on ascertained obstacles. In FIGS. 2 and 3, however, obstacles H1 and H2 restrict the necessary movement path.

The corrective movement proposed or carried out in the sense of a forward movement can, if necessary, also additionally contain a steering correction.

In the presence of situation S1, the forward movement is preferably recommended or carried out at least until the maximum reversible bend angle $\alpha_{1max}$; $\alpha_{2max}$ is undershot.

In the presence of situations S2 and/or S3, the forward movement is preferably recommended or performed until the combination is straight.

The maximum reversible bend angle $\alpha_{1max}$; $\alpha_{2max}$ (applicable to the left or right of the zero line) can be specified, preferably in a variable manner, depending on the drawbar length a of the trailer on which it depends and which also can be stored.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for steering a towing vehicle coupled with a trailer, comprising:
    an electronic control unit;
    a sensor that captures a bend angle of the vehicle and trailer combination; and
    a display unit coupled with the electronic control unit, wherein
    the electronic control unit comprises:
        a memory region that stores a maximum reversible bend angle;
        a memory region that stores an upper bend angle change threshold value; and
        a memory region that stores a left hand bend angle range and a right hand bend angle range related to a zero line corresponding to a straight combination; and
        a functional unit operatively configured to output on the display unit a recommended action for moving forward, and/or to carry out an autonomously executed forward movement, when
            at least one defined situation related to one or more of the maximum reversible bend angle, the upper bend angle change threshold value, the left hand bend angle range and the right hand bend angle range, stored in the memory regions, is determined via evaluation of the sensor.

2. The control system as claimed in claim 1, wherein a first defined situation is present when the actual bend angle has exceeded the maximum reversible bend angle in the left hand bend angle range or the maximum reversible bend angle in the right hand bend angle range.

3. The control system as claimed in claim 2, wherein a second defined situation is present when a difference between the actual bend angle and a target bend angle has exceeded the upper bend angle change threshold value.

4. The control system as claimed in claim 3, wherein a third defined situation is present when the actual bend angle lies in the left hand bend angle range and a target bend angle lies in the right hand bend angle range, or vice versa.

5. The control system as claimed in claim 1, wherein a second defined situation is present when a difference between the actual bend angle and a target bend angle has exceeded the upper bend angle change threshold value.

6. The control system as claimed in claim 1, wherein a third defined situation is present when the actual bend angle lies in the left hand bend angle range and a target bend angle lies in the right hand bend angle range, or vice versa.

7. An electronic control unit that implements a control system for steering a towing vehicle coupled with a trailer, comprising:
    memory that stores a maximum reversible bend angle, an upper bend angle change threshold value, a left hand bend angle range, and a right bend angle range; and
    a processor operatively configured to execute program code to:
    output, to a display, a recommended action for moving forward, and/or carry out an autonomously executed forward movement, when
        at least one defined situation related to one or more of the maximum reversible bend angle, the upper bend angle change threshold value, the left hand bend angle range and the right bend angle range, stored in the memory, is determined based on an evaluation of a sensor of the towing vehicle.

8. A steering method for steering a towing vehicle coupled with a trailer to form a combination, the method comprising the steps of:
    storing a maximum reversible bend angle, an upper bend angle change threshold value, a left hand bend angle range, and a right bend angle range in a memory;
    capturing a bend angle of the combination by a sensor;
    outputting a recommended action for moving forward, and/or autonomously executing forward movement, on a display when
        at least one defined situation related to one or more of the maximum reversible bend angle, the upper bend angle change threshold value, the left hand bend angle range and the right bend angle range, stored in the memory, is determined based on evaluating the captured bend angle of the combination.

\* \* \* \* \*